(12) United States Patent
Surianarayanan et al.

(10) Patent No.: US 11,960,753 B2
(45) Date of Patent: Apr. 16, 2024

(54) SOLUTION FOR SUPER DEVICE IMBALANCE IN ZNS SSD

(71) Applicant: Western Digital Technologies, Inc., San Jose, CA (US)

(72) Inventors: Ravishankar Surianarayanan, Bangalore (IN); Matias Bjorling, Copenhagen (DK)

(73) Assignee: Western Digital Technologies, Inc., San Jose, CA (US)

( * ) Notice: Subject to any disclaimer, the term of this patent is extended or adjusted under 35 U.S.C. 154(b) by 80 days.

(21) Appl. No.: 17/412,140

(22) Filed: Aug. 25, 2021

(65) Prior Publication Data
US 2023/0061979 A1    Mar. 2, 2023

(51) Int. Cl.
G06F 3/00       (2006.01)
G06F 3/06       (2006.01)
G06F 12/02      (2006.01)

(52) U.S. Cl.
CPC .......... G06F 3/0655 (2013.01); G06F 3/0604 (2013.01); G06F 3/0679 (2013.01); G06F 12/0246 (2013.01); G06F 2212/7211 (2013.01)

(58) Field of Classification Search
CPC .... G06F 3/0655; G06F 3/0604; G06F 3/0679; G06F 12/0246; G06F 2212/7211
See application file for complete search history.

(56) References Cited

U.S. PATENT DOCUMENTS

| | | | |
|---|---|---|---|
| 2011/0271030 A1 | 11/2011 | Iaculo et al. | |
| 2012/0144144 A1* | 6/2012 | Worthington | ......... G06F 3/0631 711/170 |
| 2013/0311703 A1 | 11/2013 | Cheng et al. | |
| 2015/0286524 A1 | 10/2015 | Trantham | |
| 2016/0253121 A1 | 9/2016 | Guo et al. | |
| 2018/0067850 A1 | 3/2018 | Kawamura et al. | |
| 2019/0095109 A1 | 3/2019 | Zhou | |
| 2019/0384704 A1 | 12/2019 | Gorobets et al. | |
| 2020/0125294 A1 | 4/2020 | Parker | |
| 2020/0142600 A1 | 5/2020 | Agombar et al. | |
| 2020/0409586 A1 | 12/2020 | Feigin et al. | |

(Continued)

OTHER PUBLICATIONS

International Search Report and Written Opinion for International Application No. PCT/US2022/027970 dated Oct. 4, 2022.

*Primary Examiner* — Reginald G Bragdon
*Assistant Examiner* — Michael L Westbrook
(74) *Attorney, Agent, or Firm* — PATTERSON + SHERIDAN, LLP

(57) ABSTRACT

A data storage device includes a memory device and a controller coupled to the memory device. The memory device includes at least a first super device and a second super device. Each of the super devices includes a plurality of active zones and a threshold value for a number of cold zones. The controller classifies zones as either a cold zone or hot zone depending the number of resets to the zone. If the number of resets to the zone is greater than a threshold reset value, then the zone is classified as a hot zone, otherwise the zone is classified as a cold zone. The controller is configured to determine that the number of cold zones is greater than the threshold value for a super device and move data from at least one cold zone from the super device to a zone of another super device.

7 Claims, 5 Drawing Sheets

(56) References Cited

U.S. PATENT DOCUMENTS

| | | |
|---|---|---|
| 2021/0019052 A1 | 1/2021 | Galbo et al. |
| 2021/0216446 A1 | 7/2021 | Yang et al. |
| 2021/0240390 A1* | 8/2021 | Kim ............... G06F 3/0649 |
| 2022/0137840 A1* | 5/2022 | Lee ............... G06F 3/0652 |
| | | 711/154 |

* cited by examiner

SOLUTION FOR SUPER DEVICE IMBALANCE IN ZNS SSD

BACKGROUND OF THE DISCLOSURE

Field of the Disclosure

Embodiments of the present disclosure generally relate to data storage devices, such as solid state drives (SSDs), having Zoned Namespace (ZNS) architecture.

Description of the Related Art

ZNS SSDs are a class of SSDs that supports either sequential only zones and zone random write area (ZRWA). In a sequential only zones ZNS SSD, zone data is written sequentially without overwrites. However, in a ZRWA ZNS SSD, zones are written to randomly and with overwrites. Typically, ZNS SSDs supports sequential only zones. In order to overwrite a sequential zone, the zone must be reset before writing to the zone again. A zone reset is an unmapping of all the data in the zone.

Consider the case of a SSD having two active open zones and two super devices (SDs). In order to achieve higher write performance, each zone is mapped to a super block (SB) of an SD, where a SB includes a set of blocks across each die of an SD. When writing to a particular zone, the zone must be reset prior to writing to a previous logical block address (LBA) of the zone or when writing to a full zone. When an SD is at capacity or if the free space of the SD is below a critical threshold (e.g., the minimum free space that must be maintained in an SD), the SD is no longer usable and the data storage device performance may be impacted by the loss of the usability of the SD. For example, in a two SD SSD, if both SDs have a write performance of about 1000 Mbps, the total SSD write performance is about 2000 Mbps. However, if one SD is can no longer be written to due to the amount of free space decreasing below a critical threshold, the total SSD write performance decreases to about 1000 Mbps.

Therefore, there is a need to balance zones across one or more SDs in a ZNS SSD.

SUMMARY OF THE DISCLOSURE

The present disclosure generally relates to data storage devices, such as solid state drives (SSDs), having Zoned Namespace (ZNS) architecture. A data storage device includes a memory device and a controller coupled to the memory device. The memory device includes at least a first super device and a second super device. Each of the super devices includes a plurality of active zones and a threshold value for a number of cold zones. The controller classifies zones as either a cold zone or hot zone depending the number of resets to the zone. If the number of resets to the zone is greater than a threshold reset value, then the zone is classified as a hot zone, otherwise the zone is classified as a cold zone. The controller is configured to determine that the number of cold zones is greater than the threshold value for a super device and move data from at least one cold zone from the super device to a zone of another super device.

In one embodiment, a data storage device includes a memory device and a controller coupled to the memory device. The memory device is arranged into a first super device having a first plurality of active zones and a second super device having a second plurality of active zones. The controller is configured to set a first threshold value for a number of cold zones in the first super device, wherein a cold zone is a zone that is overwritten less than a hot zone, set a second threshold value for a number of cold zones in the second super device, determine that the first super device has at least one cold zone greater than the first threshold value, determine that the second super device has at least one cold zone less than the first threshold value, and move data from at least one cold zone from the first super device to a zone in the second super device to effectively move the at least one cold zone from the first super device to the second super device.

In another embodiment, a data storage device includes a memory device and a controller coupled to the memory device. The memory device is arranged into a first super device having a first plurality of active zones and a second super device having a second plurality of active zones. The controller is configured to determine that the first super device has reached a threshold limit, wherein the threshold limit is the minimum free space to be maintained within the first super device and move data from at least one zone of the first plurality of active zones of the first super device to at least one other zone of the second plurality of active zones of the second super device in response to the determining.

In another embodiment, a data storage device includes memory means and a controller coupled to the memory means. The memory means is arranged into a plurality of super devices each having a plurality of active zones. The controller is configured to move data between super devices to ensure a substantially even distribution of cold zones across the plurality of super devices. A cold zone is a zone that is overwritten less than a hot zone.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), having Zoned Namespace (ZNS) architecture. A data storage device includes a memory device and a controller coupled to the memory device. The memory device includes at least a first super device and a second super device. Each of the super devices includes a plurality of active zones and a threshold value for a number of cold zones. The controller classifies zones as either a cold zone or hot zone depending the number of resets to the zone. If the number of resets to the zone is greater than a threshold reset value, then the zone is classified as a hot zone, otherwise the zone is classified as a cold zone. The controller is configured to determine that the number of cold zones is greater than the threshold value for a super device and move data from at least one cold zone from the super device to a zone of another super device.

Figure 1:
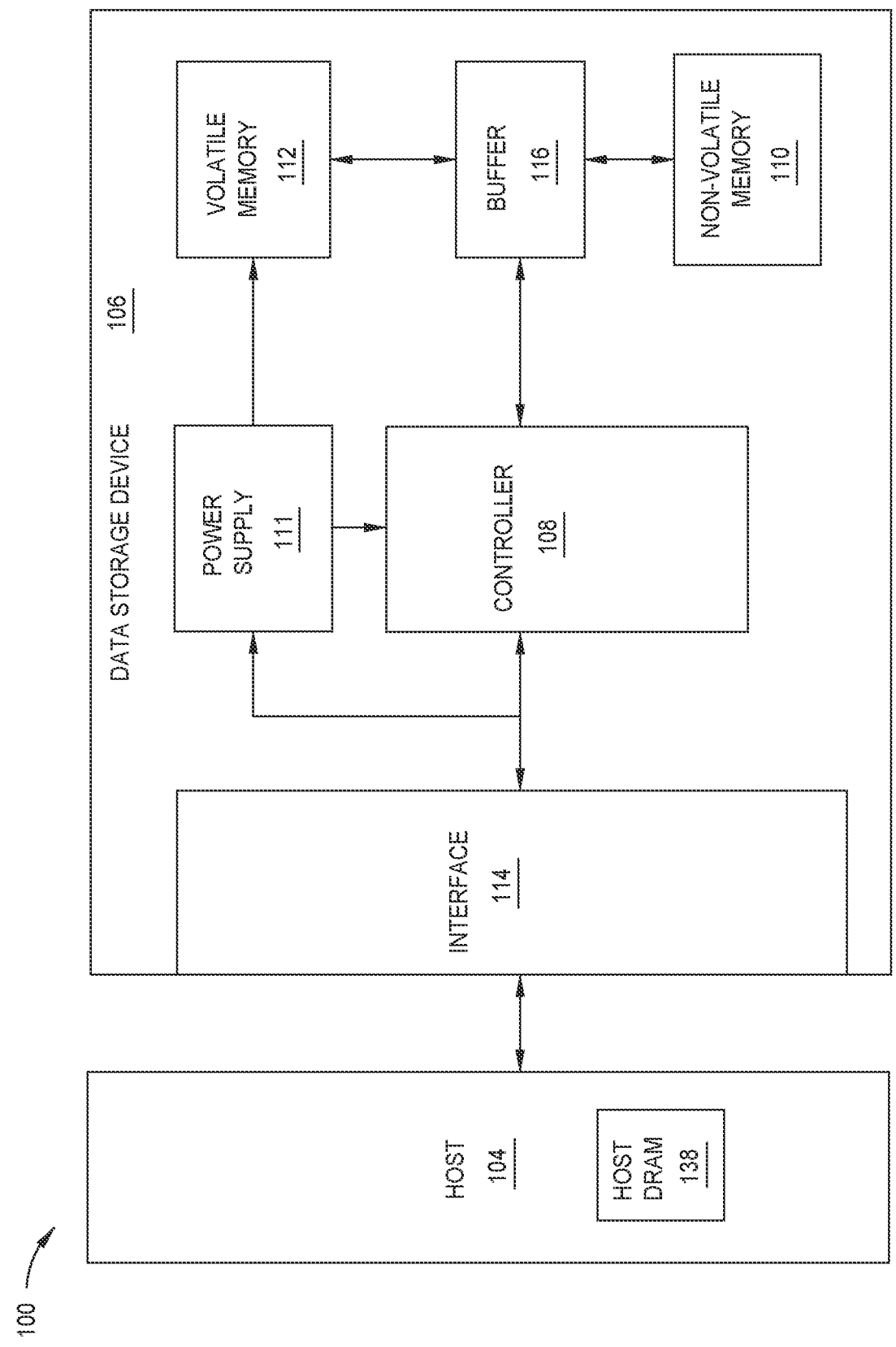
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2A:
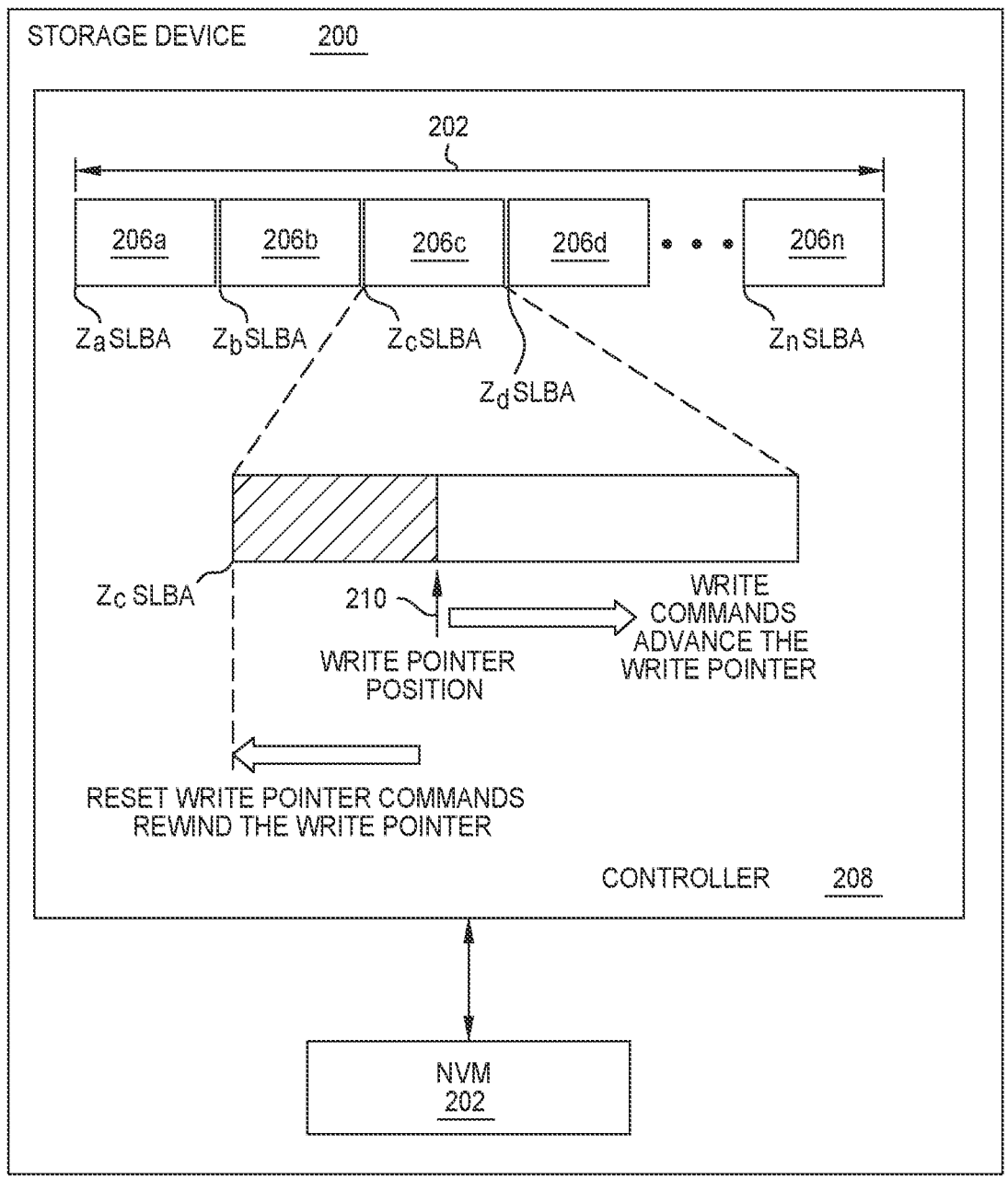
FIG. 2A is an illustration of a zoned namespace utilized in a storage device, according to certain embodiments.

FIG. 2A is an illustration of a Zoned Namespaces (ZNS) 202 view utilized in a data storage device 200, according to certain embodiments. The data storage device 200 may present the ZNS 202 view to a host device, such as the host device 104 of FIG. 1. The data storage device 200 may be the storage device 106 of the storage system 100 of FIG. 1. The data storage device 200 may have one or more ZNS 202, and each ZNS 202 may be different sizes. The data storage device 200 may further comprise one or more conventional namespaces in addition to the one or more Zoned Namespaces 202. Moreover, the ZNS 202 may be a zoned block command (ZBC) for SAS and/or a zoned-device ATA command set (ZAC) for SATA. Host side zone activity may be more directly related to media activity in zoned drives due to the relationship of logical to physical activity possible.

In the data storage device 200, the ZNS 202 is the quantity of NVM that can be formatted into logical blocks such that the capacity is divided into a plurality of zones 206a-206n (collectively referred to as zones 206). The NVM may be the storage unit or NVM 110 of FIG. 1. Each of the zones 206 comprise a plurality of physical or erase blocks (not shown) of a memory unit or NVM 204, and each of the erase blocks are associated a plurality of logical blocks (not shown). Each of the zones 206 may have a size aligned to the capacity of one or more erase blocks of a NVM or NAND device 204. When the controller 208 receives a command, such as from a host device (not shown) or the submission queue of a host device, the controller 208 can read data from and write data to the plurality of logical blocks associated with the plurality of erase blocks (EBs) of the ZNS 202. Each of the logical blocks is associated with a unique LBA or sector.

In one embodiment, the NVM 204 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 KiB per page). Furthermore, each page can be accessed at a granularity equal to or smaller than the full page. A controller can frequently access NAND in user data granularity logical block address (LBA) sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

When data is written to an erase block, one or more logical blocks are correspondingly updated within a zone 206 to track where the data is located within the NVM 204. Data may be written to one zone 206 at a time until a zone 206 is full, or to multiple zones 206 such that multiple zones 206 may be partially full. Similarly, when writing data to a particular zone 206, data may be written to the plurality of erase blocks one block at a time, in sequential order of NAND locations, page-by-page, or wordline-by-wordline, until moving to an adjacent block (i.e., write to a first erase block until the first erase block is full before moving to the second erase block), or to multiple blocks at once, in sequential order of NAND locations, page-by-page, or wordline-by-wordline, to partially fill each block in a parallel fashion (i.e., writing the first NAND location or page of each erase block before writing to the second NAND location or page of each erase block). This sequential programming of every NAND location is a typical non-limiting requirement of many NAND EBs.

When a controller 208 selects the erase blocks that will store the data for each zone, the controller 208 will be able to choose the erase blocks either at the zone open time, or it may choose the erase blocks as it reaches a need to fill the first wordline of that particular erase block. This may be more differentiating when the above described method of filling one erase block completely prior to starting the next erase block is utilized. The controller 208 may use the time difference to select a more optimal erase block in a just-in-time basis. The decision of which erase block is allocated and assigned for each zone and its contiguous LBAs can be occurring for zero or more concurrent zones at all times within the controller 208.

Each of the zones 206 is associated with a zone starting logical block address (ZSLBA) or zone starting sector. The ZSLBA is the first available LBA in the zone 206. For example, the first zone 206a is associated with $Z_a$SLBA, the second zone 206b is associated with $Z_b$SLBA, the third zone 206c is associated with $Z_c$SLBA, the fourth zone 206d is associated with $Z_d$SLBA, and the $n^{th}$ zone 206n (i.e., the last zone) is associated with $Z_n$SLBA. Each zone 206 is identified by its ZSLBA, and is configured to receive sequential writes (i.e., writing data to the NVM 110 in the order the write commands are received).

As data is written to a zone 206, a write pointer 210 is advanced or updated to point to or to indicate the next available block in the zone 206 to write data to in order to track the next write starting point (i.e., the completion point of the prior write equals the starting point of a subsequent write). Thus, the write pointer 210 indicates where the subsequent write to the zone 206 will begin. Subsequent write commands are 'zone append' commands, where the data associated with the subsequent write command appends to the zone 206 at the location the write pointer 210 is indicating as the next starting point. An ordered list of LBAs within the zone 206 may be stored for write ordering. Each zone 206 may have its own write pointer 210. Thus, when a write command is received, a zone is identified by its ZSLBA, and the write pointer 210 determines where the write of the data begins within the identified zone.

Figure 2B:
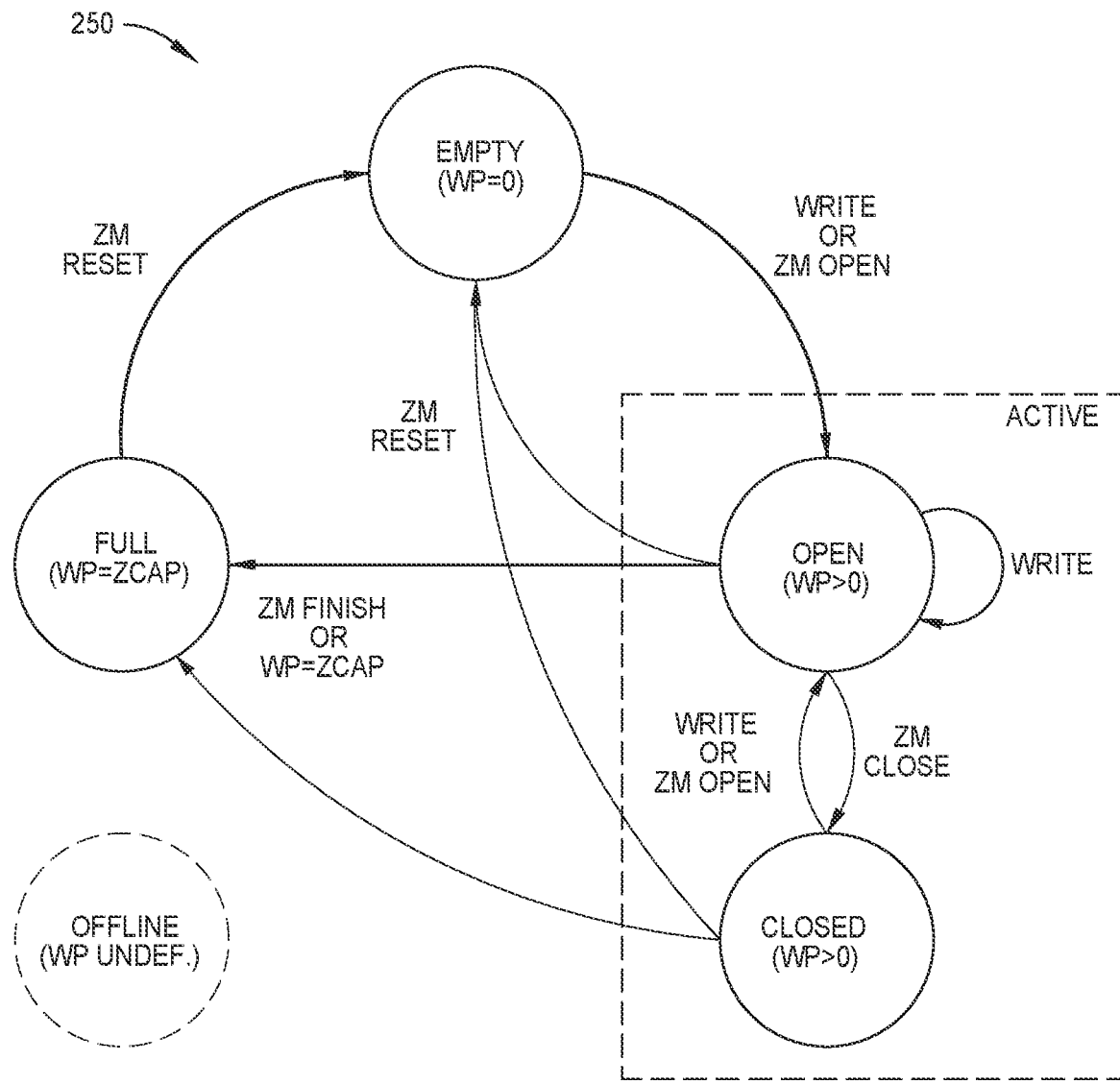
FIG. 2B is an illustration of a state diagram for the zoned namespaces of the storage device of FIG. 2A, according to certain embodiments.

FIG. 2B is an illustration of a state diagram 250 for the ZNS 202 of the data storage device 200 of FIG. 2A, according to certain embodiments. In the state diagram 250, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if the zone open command is issued by the host. Zone management (ZM) commands can be used to move a zone between zone open and zone closed states, which are both active states. If a zone is active, the zone comprises open blocks that may be written to, and the host may be provided a description of recommended time in the active state. The controller 208 comprises the ZM. Zone metadata may be stored in the ZM and/or the controller 208.

The term "written to" includes programming user data on 0 or more NAND locations in an erase block and/or partially filled NAND locations in an erase block when user data has not filled all of the available NAND locations. The term "written to" may further include moving a zone to full due to internal drive handling needs (open block data retention concerns because the bits in error accumulate more quickly on open erase blocks), the data storage device 200 closing or filling a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The movement of a zone from an open state to a closed state allows the controller 208 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available sectors or LBAs to write data to (i.e., WP=zone capacity (ZCAP)). In a full zone, the write pointer points to the end of the writeable capacity of the zone. Read commands of data stored in full zones may still be executed.

The zones may have any total capacity, such as 256 MiB or 512 MiB. However, a small portion of each zone may be inaccessible to write data to, but may still be read, such as a portion of each zone storing the parity data and one or more excluded erase blocks. For example, if the total capacity of a zone 206 is 512 MiB, the ZCAP may be 470 MiB, which is the capacity available to write data to, while 42 MiB are unavailable to write data. The writeable capacity (ZCAP) of a zone is equal to or less than the total zone storage capacity. The data storage device 200 may determine the ZCAP of each zone upon zone reset. For example, the controller 208 or the ZM may determine the ZCAP of each zone. The data storage device 200 may determine the ZCAP of a zone when the zone is reset.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the data storage device 200 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the data storage device 200. The data storage device 200 may mark one or more erase blocks for erasure. When a new zone is going to be formed and the data storage device 200 anticipates a ZM open, the one or more erase blocks marked for erasure may then be erased. The data storage device 200 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 210 for the zone 206 may be selected, enabling the zone 206 to be tolerant to receive commands out of sequential order. The write pointer 210 may optionally be turned off such that a command may be written to whatever starting LBA is indicated for the command.

Referring back to FIG. 2A, when the host device 104 sends a write command to write data to a zone 206, the controller 208 pulls-in the write command and identifies the write command as a write to a newly opened zone 206. The controller 208 selects a set of EBs to store the data associated with the write commands of the newly opened zone 206 to, and the newly opened zone 206 switches to an active zone 206. The write command may be a command to write new data, or a command to move valid data to another zone for garbage collection purposes. The controller 208 is configured to DMA read new commands from a submission queue populated by a host device.

In an empty zone 206 just switched to an active zone 206, the data is assigned to the zone 206 and the associated set of sequential LBAs of the zone 206 starting at the ZSLBA, as the write pointer 210 is indicating the logical block associated with the ZSLBA as the first available logical block. The data may be written to one or more erase blocks or NAND locations that have been allocated for the physical location of the zone 206. After the data associated with the write command has been written to the zone 206, a write pointer 210 is updated to point to the next LBA available for a host write (i.e., the completion point of the first write). The write data from this host write command is programmed sequentially into the next available NAND location in the erase block selected for physical backing of the zone.

For example, the controller 208 may receive a first write command to a third zone 206c, or a first zone append command. The host device 104 identifies sequentially which logical block of the zone 206 to write the data associated with the first command to. The data associated with the first command is then written to the first or next available LBA(s) in the third zone 206c as indicated by the write pointer 210, and the write pointer 210 is advanced or updated to point to the next available LBA available for a host write (i.e., WP>0). If the controller 208 receives a second write command to the third zone 206c, or a second zone append command, the data associated with the second write command is written to the next available LBA(s) in the third zone 206c identified by the write pointer 210. Once the data associated with the second command is written to the third zone 206c, the write pointer 210 once again advances or updates to point to the next available LBA available for a host write. Resetting the third zone 206c moves the write pointer 210 back to the $Z_c$SLBA (i.e., WP=0), and the third zone 206c switches to an empty zone.

In the description herein, the term "erase block" may be referred to as "block" for simplification purposes.

Figure 3A:
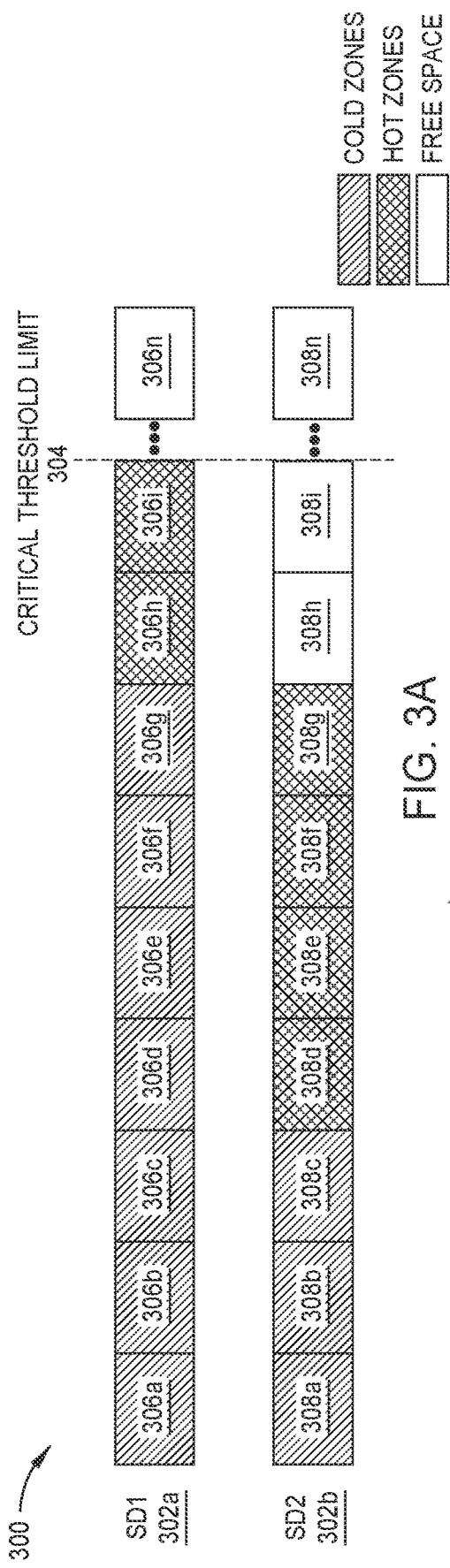
FIGS. 3A and 3B are illustrations of a first super device having a first and a second super device having a second plurality of zones, according to certain embodiments.
Figure 3B:
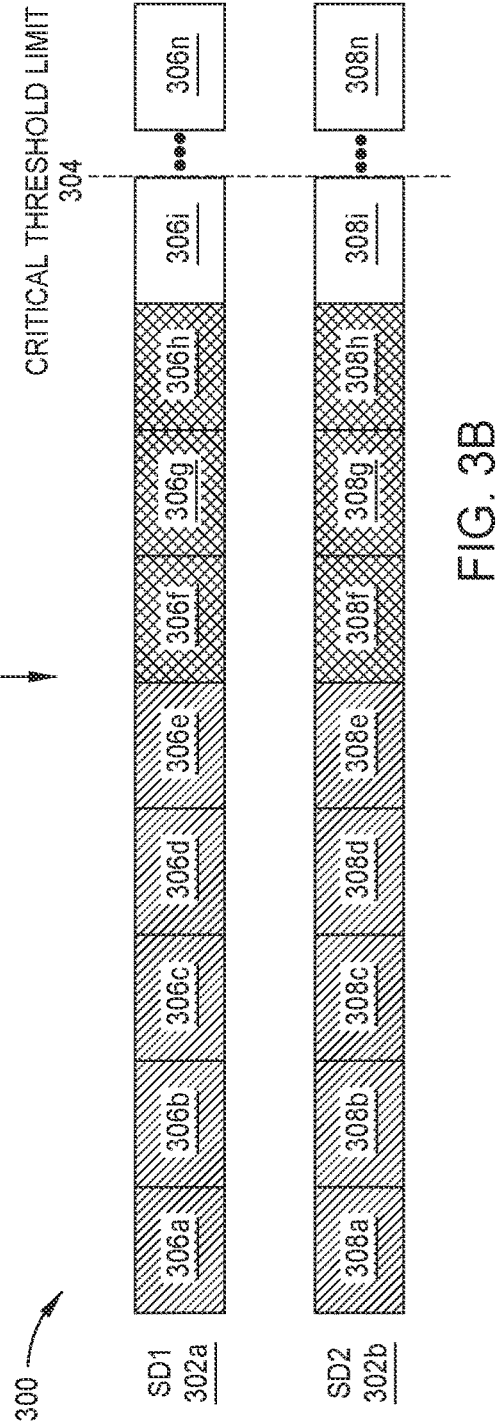

FIGS. 3A and 3B are illustrations of a first super device (SD) 302a having a first plurality of zones 306a-306n and a second SD 302b having a second plurality of zones 308a-308n, according to certain embodiments. The first plurality of zones 306a-306n and the second plurality of zones 308a-308n may be the zones 206 of FIG. 2. It is to be understood that the depicted number of zones of the first SD 302a and the second SD 302b is not intended to be limiting, but provide an example of a possible embodiment. Rather, the number of zones of the first SD 302a and the second SD 302b may be dependent on the capacity of the relevant SD and the zone size.

An SD is a sub-device of a data storage device, such as the data storage device 106 of FIG. 1. The SD includes a set of dies of a NVM, such as the NVM 110 of FIG. 1. For example, if an SD has a capacity of about 32 dies, then an NVM including about 64 dies may include 2 SDs. Therefore, the data storage device 106 may include up to as many SDs as the capacity of the data storage device 106 will allow. Furthermore, data of each zone is written separately in a different location of the NVM. For example, a super block (SB), which is a set of blocks of each die of an SD, may include data of a single zone.

Zones of the SD 302a, 302b that include data (e.g., an open and active zone) may be classified as either a cold zone or a hot zone. The classification or designation as a cold zone or a hot zone may be based on a number of overwrites (i.e., requiring a reset) or a number of resets of a zone (i.e., reset count). Hot zones are zones that are overwritten more frequently and cold zones are zones that are less frequently overwritten. For example, the following logical statement may describe a classification of the zones of the data storage device 106 by a controller, such as the controller 108 of FIG. 1.

```
zone_reset_count[MAX_NUMBER_ZONES];
if(zone_reset_count[zone] > zone_reset_threshold)
    zone_state = hot zone
else
    zone_state = cold zone
```

The zone_reset_threshold is a threshold reset value that may be based on a static value, such as value preset during data storage device 106 initiation, or a dynamic value, such as a value based on a moving average of resets per zone. When the number of resets for a zone is greater than the zone_reset_threshold, the controller 108 classifies the zone as a hot zone. However, when the number of resets for a zone is less than the zone_reset_threshold, the controller 108 classifies the zone as a cold zone. Furthermore, each SD 302a, 302b has a critical threshold limit 304. Although the critical threshold limit 304 is shown to be the same for both the first SD 302a and the second SD 302b, the critical threshold limit 304 may be SD specific, such that each SD has a different critical threshold limit 304.

Referring to FIG. 3A, the first SD 302a includes a plurality of zones 306a-306n, where zones 306a-306g are cold zones and zones 306h and 306i are hot zones. Likewise, the second SD 302b includes a plurality of zones 308a-308n, where zones 308a-308c are cold zones and 308d-308g are hot zones. It is to be understood that the illustrated grouping of cold zones and hot zones are for exemplary purposes. Furthermore, the first SD 302a and the second SD 302b may have the same number of active zones of the plurality of zones. The first SD 302a and the second SD 302b are write active, such that the controller 108 may schedule and perform write operations to the zones of the first SD 302a and the second SD 302b.

When the critical threshold limit 304 is reached or exceeded, such as in the first SD 302a, the controller 108 may stop writes to the first SD 302a until the amount free space of the first SD 302a improves. The amount of free space of the first SD 302a may be improved by a zone reset. However, until the amount of free space of the first SD 302a improves, the controller 108 may schedule writes only to the second SD 302b. The critical threshold limit 304 represents a maximum amount of data or zones that may be programmed to an SD, such that a minimum amount of free space is maintained. For example, if a capacity of the SD is about 256 GB and the critical threshold limit 304 is about 202 GB, then the minimum amount of free space to be maintained is about 54 GB.

In one embodiment, when the controller 108 determines that the critical threshold limit 304 has been reached for an SD, such as the first SD 302a, the controller 108 may determine to move data of one or more cold zones of the SD that has reached the critical threshold limit 304 to another SD that has not yet reached the critical threshold limit 304. For example, because the second SD 302b has not reached the critical threshold limit 304, the data of one or more cold zones of the first SD 302a may be moved to a corresponding one or more zones (i.e., active zones that have not been programmed to) the second SD 302b. The one or more cold zones of the first SD 302a corresponding to the data that was migrated or moved to one or more zones of the second SD 302b are reset, so that data may be programmed to those zones.

Referring to FIG. 3B, two cold zones of the first SD 302a of FIG. 3A have been moved or migrated to the second SD 302b and a hot zone of the second SD 302b of FIG. 3A has been moved or migrated to the first SD 302a. When moving data of a cold zone or a hot zone to a different SD, the corresponding zone reset count may follow the data of the cold zone or the hot zone. For example, if the first cold zone of the first SD 302a with a zone reset count of 3 is moved or migrated to a zone of the second SD 302b, such as an eighth zone 308h, the eighth zone 308h will be associated with a zone reset count of 3. The controller 108 may be configured to move cold zones and hot zones between SDs such that the number of cold zones and the number of hot zones of each SD 302a, 302b are equal or as close to equal as possible (e.g., +/− one hot or cold zone). Thus, each SD 302a, 302b may have free space zones 306i, 308i so that both SDs 302a, 302b remain active and are able to be written to (i.e., both SDs contribute to write performance).

In another embodiment, the controller 108 may determine a threshold number of cold zones for each SD 302a, 302b, where the threshold number of cold zones represents a maximum number of cold zones that the SD may include. For example, the first SD 302a may have a first threshold number of cold zones and the second SD 302b may have a second threshold number of cold zones. In one embodiment, the first threshold number and the second threshold number are equal. In another embodiment, the first threshold number and the second threshold number are different. In a data storage device 106 having more than two SDs, each SD may have either the same threshold number of cold zones, a different threshold number of cold zones, or a mixture of the previously listed threshold number of cold zones, such that some SDs have the same threshold number of cold zones and other SDs have a different threshold number of cold zones.

In one example, the first threshold number of cold zones for the first SD 302a and the second threshold number of cold zones for the second SD 302b are the same. For example, the first and the second threshold number may be about 6 cold zones. Referring to FIG. 3A, the first SD 302a has seven zones 306a-306g that are cold zones. Because the number of cold zones of the first SD 302a is greater than the first threshold number, the controller 108 determines to move one or more cold zones (i.e., the data of the one or more cold zones) from the first SD 302a to the second SD 302b so that the number of cold zones of the first SD 302a is less than the first threshold number. The one or more cold zones of the first SD 302a that is moved the second SD 302b is reset after moving or migrating the data to the second SD 302b.

In one embodiment, the number of cold zones of each SD are substantially equal, the number of hot zones of each SD are substantially equal, and/or the number of free space zones (i.e., active zones not yet written to) of each SD are substantially equal. In another embodiment, the number of free space zones plus the number of hot zones of each SD are substantially equal. The controller 108 may be configured to ensure that the number of free space zones and/or the number of hot zones across a plurality of SDs are substantially even or equal.

Furthermore, after moving the data of the cold zones (and/or the hot zones), the relevant zones are reset and the data of the cold zones (and/or the hot zones) are remapped. The controller 108 may remap the moved data, such that a flash translation layer table that stores the mapping of the logical block address (LBA) to the physical block address (PBA) is updated with the new LBA to PBA information. In some embodiments, the moving of the data of the cold zones from one SD to another SD may occur in the background, such as during data storage device 106 idle time or while the relevant SDs are not being utilized. Regardless of how the data is moved, whether in the background or as an active operation, the moving of the data of a cold zone (and similarly, the data of a hot zone) from one SD to another SD effectively moves the cold zone (or hot zone) from the one SD to the another SD.

Figure 4:
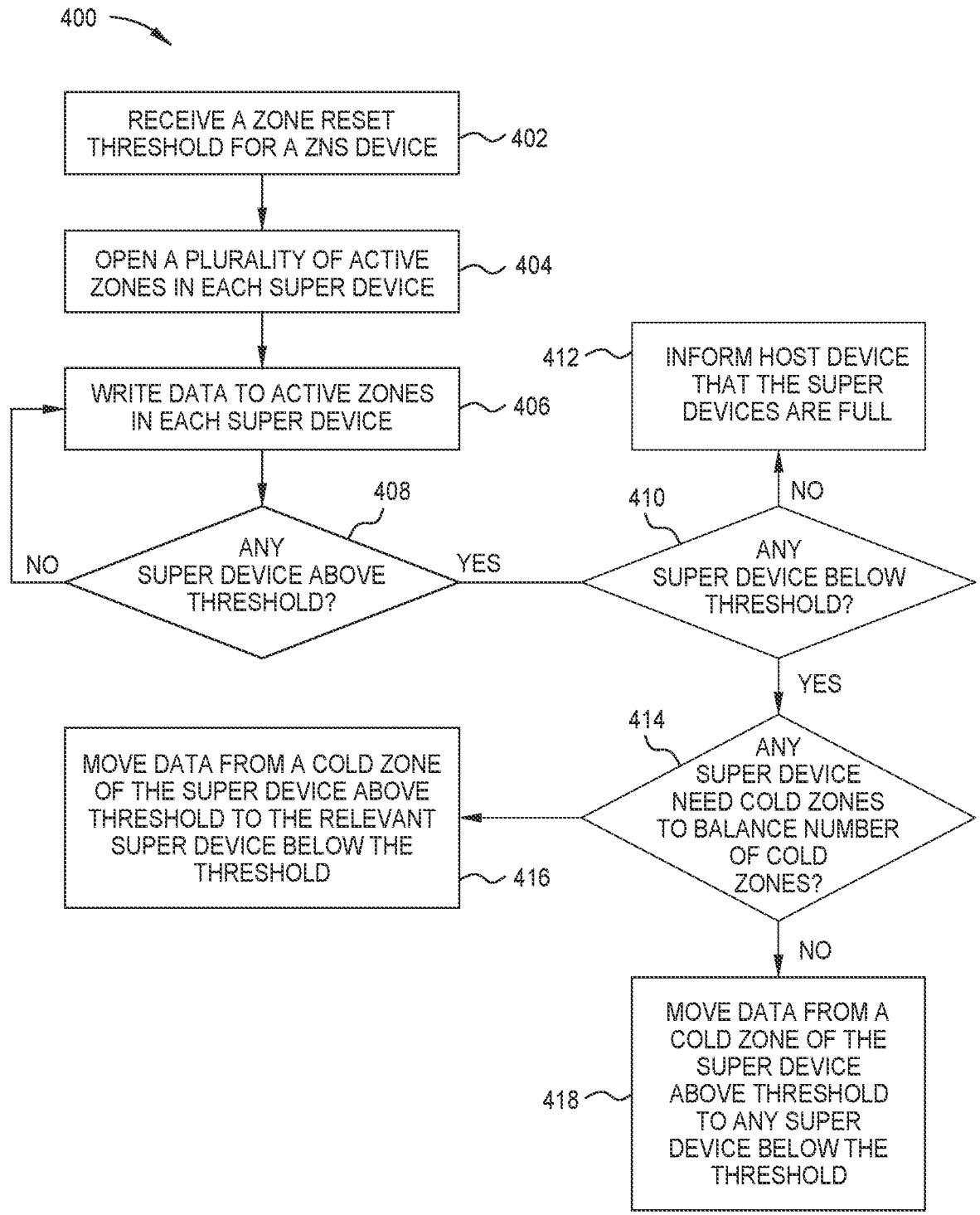
FIG. 4 is a flow diagram illustrating a method of balancing cold zones across a plurality of super devices, according to certain embodiments.

FIG. 4 is a flow diagram illustrating a method 400 of balancing cold zones across a plurality of super devices, according to certain embodiments. Method 400 may be executed by a controller, such as the controller 108 of FIG. 1, to balance the number of cold zones across a plurality of super devices, such as the first SD 302a and the second SD 302b of FIGS. 3A and 3B. At block 402, the controller 108 receives a zone reset threshold for a ZNS device, which may be the NVM 110 of FIG. 1. The zone reset threshold may be provided by a host device, such as the host device 104 of FIG. 1, or configured by the controller 108, such that the controller 108 determines the zone reset threshold. The zone reset threshold (e.g., zone_reset_threshold) may be based on a static value, such as value preset during data storage device 106 initiation, or a dynamic value, such as a value based on a moving average of resets per zone.

At block 404, the controller 108 opens a plurality of active zones of each SD, such that write commands may be scheduled to each of the plurality of active zones and data may be programmed to each of the plurality of active zones. As write commands are received by the controller 108 from the host device 104, the controller 108 schedules the write commands and programs the data of the write commands to a target active zone of the target SD at block 406. At block 408, the controller 108 determines if there are any SDs above a threshold. The threshold may either correspond to a critical threshold limit, such as the critical threshold limit 304 of FIG. 3, or a threshold number of cold zones in the relevant SD. If the threshold has not been met or exceeded, then method 400 returns to block 406.

However, if the controller 108 determines that an SD is above the threshold (i.e., critical threshold limit or threshold number of cold zones) at block 408, the controller 108 determines if there are any SDs below the threshold at block 410. If there are no SDs below the threshold at block 410, the controller 108 informs the host device 104 that the SDs are full at block 412. However, if the controller 108 determines that there is at least one SD (i.e., one or more SDs) below the threshold at block 410, then the controller 108 further determines if there are any SDs that need cold zones to balance the number of cold zones at block 414.

If there is an SD that needs cold zones to balance the number of cold zones at block 414, then the controller 108 moves the data from the cold zone of the SD above the threshold to a free space zone of the relevant SD that is below the threshold at block 416. The selected SD that is below the threshold may be selected based on a balancing mechanism, such that the number of cold zones across each SD are substantially similar (e.g., each SD has the same or a similar number of cold zones). However, if there is not an SD that needs cold zones to balance the number of cold zones at block 414, then the controller 108 moves the data from the cold zone of the SD above the threshold to a free space zone of any SD that is below the threshold at block 418. The selected SD may be selected based on a usage statistic, such as a usage type or usage rate, wear-leveling characteristics, freshness of data in the selected SD, or may be selected based on a random selection. In one embodiment, if two or more SDs include an equal number of cold zones, the cold zones of the two or more SDs may not be moved to a selected SD since the two or more SDs may have about an equal number of free space remaining.

By balancing the number of cold zones across each super device of a data storage device, the write performance of the data storage device may be improved because the data storage device can maintain a substantially even wear over the lifetime of the device.

In one embodiment, a data storage device includes a memory device and a controller coupled to the memory device. The memory device is arranged into a first super device having a first plurality of active zones and a second super device having a second plurality of active zones. The controller is configured to set a first threshold value for number of cold zones in the first super device, wherein a cold zone is a zone that is overwritten less than a hot zone, set a second threshold value for a number of cold zones in the second super device, determine that the first super device has at least one cold zone greater than the first threshold value, determine that the second super device has at least one cold zone less than the first threshold value, and move data from at least one cold zone from the first super device to a zone in the second super device to effectively move the at least one cold zone from the first super device to the second super device.

A zone is classified as hot or cold depending upon a zone reset count. A zone is a hot zone if the zone reset count is greater than a zone reset threshold. A zone is a cold zone if the zone reset count is less than the zone reset threshold. The first plurality of active zones is equal to the second plurality of active zones. The at least one cold zone from the first super device is reset. After moving the data, a number of hot zones of the first super device plus a number of free space zones of the first super device is substantially equal to a number of hot zones of the second super device plus a number of free space zones of the second super device. The number of hot zones of the first super device is substantially equal to the number of hot zones of the second super device. The number of free space zones of the first super device is substantially equal to the number of free space zones of the second super device.

In another embodiment, a data storage device includes a memory device and a controller coupled to the memory device. The memory device is arranged into a first super device having a first plurality of active zones and a second super device having a second plurality of active zones. The controller is configured to determine that the first super device has reached a threshold limit, wherein the threshold limit is the minimum free space to be maintained within the first super device and move data from at least one zone of the first plurality of active zones of the first super device to at least one other zone of the second plurality of active zones of the second super device in response to the determining.

Data is written sequentially to the first plurality of active zones and the second plurality of active zones. The controller is configured to remap the moved data. The moving the data occurs as a background operation. The second super device has a threshold limit equal to the threshold limit of the first super device. Both the first super device and the second super device are write active. The first plurality of zones are sequential write zones. The at least one zone of the first plurality of zones is a random write zone.

In another embodiment, a data storage device includes memory means and a controller coupled to the memory means. The memory means is arranged into a plurality of super devices each having a plurality of active zones. The controller is configured to move data between super devices to ensure a substantially even distribution of cold zones across the plurality of super devices. A cold zone is a zone that is overwritten less than a hot zone.

The plurality of active zones in each super device is equal. The controller is configured to ensure a substantially even distribution of hot zones across the plurality of super devices. The controller is configured to ensure a substantially even distribution of free space zones across the plurality of super devices.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device, wherein the memory device is arranged into a first super device having a first plurality of active zones and a second super device having a second plurality of active zones; and
   a controller coupled to the memory device, the controller configured to:
      set a first threshold value for a number of cold zones in the first super device, wherein a cold zone is a zone that is overwritten less than a hot zone;
      set a second threshold value for a number of cold zones in the second super device;
      determine that the first super device has at least one cold zone greater than the first threshold value;
      determine that the second super device has at least one cold zone less than the second threshold value; and
      move data from at least one cold zone from the first super device to a zone in the second super device to effectively move the at least one cold zone from the first super device to the second super device.

2. The data storage device of claim 1, wherein a zone is classified as hot or cold depending upon a zone reset count.

3. The data storage device of claim 2, wherein a zone is a hot zone if the zone reset count is greater than a zone reset threshold, and wherein a zone is a cold zone if the zone reset count is less than the zone reset threshold.

4. The data storage device of claim 1, wherein the first plurality of active zones is equal to the second plurality of active zones.

5. The data storage device of claim 1, wherein after moving the data, the at least one cold zone from the first super device is reset.

6. A data storage device, comprising:

memory means for storing data, wherein the memory means is arranged into a plurality of super devices each having a plurality of active zones; and a controller coupled to the memory means, wherein the controller configured to:

move data of a cold zone between the plurality of super devices, wherein:

moving the data of the cold zone between the plurality of super devices effectively moves the cold zone from a first super device to a second super device;

a cold zone is a zone that is overwritten less than a hot zone; and moving the data of the cold zone is responsive to:

determining that a threshold value for a number of cold zones of the first super device has been reached or exceeded; and determining a number of cold zones of the second super device is at least one less than a threshold value for a number of cold zones of the second super device, wherein the threshold value for the number of cold zones of the first super device and the threshold value for the number of cold zones of the second super device are set by the controller.

7. The data storage device of claim 6, wherein the plurality of active zones in each super device are equal.

\* \* \* \* \*